United States Patent
Gine I Cortiella et al.

(10) Patent No.: US 8,447,520 B2
(45) Date of Patent: May 21, 2013

(54) DEVICE FOR AIDING THE NAVIGATION AND GUIDANCE OF AN AIRCRAFT, AND SYSTEM COMPRISING SUCH A DEVICE

(75) Inventors: Josep Gine I Cortiella, Toulouse (FR); Jean-Philippe Huynh, Tournefeuille (FR)

(73) Assignee: Airbus Operations (SAS), Toulouse Cedex (FR)

( * ) Notice: Subject to any disclaimer, the term of this patent is extended or adjusted under 35 U.S.C. 154(b) by 293 days.

(21) Appl. No.: 12/989,891

(22) PCT Filed: Apr. 30, 2009

(86) PCT No.: PCT/FR2009/000513
§ 371 (c)(1),
(2), (4) Date: Oct. 27, 2010

(87) PCT Pub. No.: WO2009/141519
PCT Pub. Date: Nov. 26, 2009

(65) Prior Publication Data
US 2011/0060483 A1 Mar. 10, 2011

(30) Foreign Application Priority Data
May 6, 2008 (FR) ...................................... 08 02510

(51) Int. Cl.
*G01S 3/802* (2006.01)

(52) U.S. Cl.
USPC ........... 701/518; 701/400; 701/469; 701/472; 701/473; 701/476; 701/495; 701/497; 701/500; 701/501; 701/505

(58) Field of Classification Search
USPC ................ 701/1, 3–18, 400–541; 434/29–59, 434/111; 340/945–983
See application file for complete search history.

(56) References Cited

U.S. PATENT DOCUMENTS

| | | | |
|---|---|---|---|
| 7,447,590 B2 | 11/2008 | Arethens | |
| 7,690,603 B2 | 4/2010 | Peyrucain et al. | |
| 7,782,229 B1 * | 8/2010 | Barber | 340/979 |
| 2008/0172149 A1 | 7/2008 | Rouquette et al. | |
| 2010/0023258 A1 | 1/2010 | Rouquette et al. | |

FOREIGN PATENT DOCUMENTS
EP 1 462 767 A1 9/2004

OTHER PUBLICATIONS
Written Opinion of the International Searching Authority, search completed Nov. 18, 2009 by the European Patent Office, for International Application No. PCT/FR2009/000513.

* cited by examiner

*Primary Examiner* — Bhavesh V Amin
(74) *Attorney, Agent, or Firm* — Novak Druce Connolly Bove + Quigg LLP (57) ABSTRACT

Device for aiding the navigation and guidance of an aircraft, and system comprising such a device. The device (1) comprises at least three independent channels and it comprises at least one computer (2) which contains means (4) for storing and means (6, 7) for calculating positions and deviations.

9 Claims, 3 Drawing Sheets

DEVICE FOR AIDING THE NAVIGATION AND GUIDANCE OF AN AIRCRAFT, AND SYSTEM COMPRISING SUCH A DEVICE

CROSS-REFERENCE TO RELATED APPLICATIONS

This application is a §371 national stage entry of International Application No. PCT/FR2009/000513, filed Apr. 30, 2009, which claims priority to French Patent Application 08/02510, filed May 6, 2008, the entire contents of which are incorporated herein by reference.

FIELD OF THE INVENTION

The present invention relates to an assistance device for navigation and guidance of an aircraft, in particular, a transport airplane, as well as a navigation and guidance system comprising such a device. The aim of such a device is to improve the guidance performance for the aircraft along a flight trajectory comprising several successive segments, with a view, in particular, to improving the ability of the aircraft to carry out performance demanding operations such as described below.

BACKGROUND OF THE INVENTION

As known, in civil air transport, airlines generally try to improve their operational procedures, more particularly, so as to:

reduce the fuel consumption and the emission of greenhouse gas,
reduce noise in urban areas; and
improve the regularity of the travel times, even with highly impaired weather conditions (wind, low clouds, bad approach visibility).

Such improvements could be achieved through performance based navigation techniques, of the PEN ("Performance Eased Navigation") type. Such techniques define a coherent set of performance requirements to be met (accuracy, integrity, continuity, availability) for implementing a flight procedure without requiring the pilot and/or the co-pilot to use a specific navigation assistance means ("Sensor Based Navigation").

A usual procedure of the RNP ("Required Navigation Performance") type is based on such a technique. In such a case, RNP trajectories are defined, having a larger flexibility than the usual procedures based on ground beacons (VOR type or VOR/DME type procedures). Indeed, a RNP trajectory is not required to fly over beacon radio-electric coverage areas, allowing a better optimization, in particular, a minimization of the trajectory lengths. In such a case, an airplane can use any existing radio-navigation means, on the sole condition that the latter reaches the level of performance required by the RNP procedure.

Moreover, a distinction is made between RNP type operations, for which the pilot and/or the co-pilot is or are to be warned should a confinement area be left, and RNAV ("aRea NAVigation") type operations, for which there exists an accuracy requirement on a 2RNP area, without any particular warning requirement should the confinement area be left.

A RNP type operation requires a permanent estimation of an overall error, with respect to a reference trajectory. Such an overall error or total system error TSE ("Total System Error") corresponds to the superimposition of three components:

a NSE error for "Navigation Sensor Error", representing an error between an estimated position and the real position of the airplane;
a FTE error for "Flight Technical Error", representing a guiding error between the trajectory defined for guiding the airplane and that actually followed; and
a PDE error for "Path definition Error", representing an error between the trajectory desired by the pilot and/or the co-pilot and the closest one, being available in a navigation data base.

The PDE error is generally negligible compared to both NSE and FTE errors. Thus, those two NSE and FTE errors are particularly valuable for improving the RNP performance of an airplane.

A usual functional architecture, for implementing RNAV or RNP procedures, such as curved approaches with no ground navigation assistance, could be operated as follows:

A/ the pilot sends a command via a display and check unit of the MCDU ("Monitoring and Control Display Unit") type, for requesting an approach. The flight management system is then called for, of the FMS ("Flight Management System") type, which, by means of an appropriate function, looks up an internal data base for providing a list of possible approaches. The pilot selects the approach he wants amongst such a list of possible approaches, being displayed by the MCDU unit. For the selected approach, the corresponding data are sent to other systems and functions of the airplane:

B/ inertial sensors of the ADIRU type ("Air Data Inertial Reference Unit") of a ADIRS ("Air Data and Inertial Reference System") system send position and speed data to a position and speed calculation function of the FMS system. The calculated position is sent to a function calculating deviations with respect to the flight plane;

C/ the lateral and vertical deviations are displayed by means of systems of the EFIS ("Electronic Flight Instrument System") type. The lateral deviation is also sent to a function for calculating the FTE component taking part in the total system error TSE. The other component of the total system error is the navigation error NSE being provided by a function issued from the ADIRS system. When the total system error TSE is calculated, the value thereof is compared to the RNP value being required, for determining the state of the RNP function;

D/ in such a usual architecture, the total system error TSE is continuously checked, and alarms are emitted if the required RNP performance is not achieved; and E/ the guidance function implements the guidance orders for supplying an automatic pilot, if the pilot has selected an automatic pilot mode. The guidance function uses the state information and the type of selected approach for supplying a guidance mode piece of information.

The previous usual architecture has a number of limitations when it is intended to reach high levels of navigation performance. Such levels are required when low RNP operations (RNP<0.3 NM) or accuracy approaches are implemented.

Such limitations can be explained based on a calculation of the deviations. The calculation of deviations and that of the position and speed are performed in a flight managing calculator of the FMC type, being, in general, only redundant twice. The FMS system (comprising those two FMC calculators) is not breakdown proof through the simultaneous resetting of its calculators, thereby resulting in both the FMS position, the flight plane and guidance being lost, as well as the ongoing RNP operation being untimely interrupted.

Should there be an error on the position or the deviation calculation in one of the two FMC calculators of such a usual architecture, it is only possible to detect such an error. To this end, it is required that the second calculator has performed the calculation correctly and the deviation between the values provided by both FMC calculators should be checked. However, without any additional information, the pilot and/or the co-pilot do not know which of the two FMC calculators has provided the erroneous data, thereby increasing the operational load in potentially tricky flight phases (proximity of the relief if getting out of the confining area).

Furthermore, different events are feared for a low RNP value operation, in particular, the following:

regarding position: a loss of position, a loss of GNSS/GPIRS position, an undetected erroneous position;

regarding flight plane: a loss of flight plane, an undetected erroneous flight plane;

regarding guidance: a loss, a loss of automatic pilot or of the guidance calculator, an undetected erroneous guidance; and regarding display: a loss, an undetected erroneous display.

It should be noticed that a performance demanding operation, such as contemplated in the present invention, could also be a usual accuracy approach without any ground assistance means or a non accuracy usual approach of the FLS ("FMS Landing System") type.

Document FR-2,887,329 is related to a low RNP flight and document FR-2,888,636 is related to a non accuracy approach.

Furthermore, it is known that the FTE guidance error closely depends on the existing delays in the whole navigation and guidance chain. Now, with the above-mentioned usual architecture, such a FTE error could be important, more specifically limiting the ability to perform low RNP value operations. Moreover, from document EP-1,464,576, a piloting assistance device is known for an aircraft upon a landing. Such a device comprises:

first calculation means for determining a position of the aircraft;

second calculation means for determining deviations between said position of the aircraft and a common segment of a flight trajectory; and transmission means for transmitting such deviations to a guidance calculator.

SUMMARY OF THE INVENTION

The present invention aims at solving the above-mentioned drawbacks. It relates to an assistance device for the navigation and guidance of an aircraft, in particular a transport airplane, allowing the navigation and guiding performance of the aircraft to be improved, including during performance demanding operations such as a low RNP value navigation or an accuracy approach.

To this end, according to the invention, said device of the type comprising:

first calculation means for determining a position of the aircraft;

second calculation means for determining deviations between said position of the aircraft and a common segment of a flight trajectory; and transmission means for transmitting such deviations to a guidance calculator, is remarkable in that:

said device comprises at least one calculator being on board the aircraft, wherein said first and second calculation means and said transmission means are integrated, and which further comprises at least the following integrated means:

first reception means for receiving a set of successive segments of a flight trajectory to be followed by the aircraft;

memorization means for recording said segments; and second reception means for receiving, repeatedly, respectively from at least three different sources of information, current position information for the aircraft;

said first calculation means are formed so as to determine, repeatedly, a consolidated position of the aircraft, from said current position information;

said second calculation means are formed so as to determine, repeatedly, deviations between said consolidated position and a common segment of the flight trajectory, being recorded in said memorization means; and said device is replicated on at least three different and independent channels so that all the processings performed by said device are simultaneously performed on said at least three channels.

Said calculator gathers the functions essential to the high performance navigation, while organizing them around an architecture, to be further described below, ensuring the robustness thereof.

Moreover, as said device is replicated on at least three independent channels, it has a high availability and more specifically allows for the automatic exclusion of a minority of erroneous outlet data.

Thus, thanks to said assistance device for navigation and guidance, the following advantages are obtained, as described below:

deviations, trajectory segments and positions from the device are true and secured for being able to be used by different subscribed systems (display, guidance, check). A consistent association is thereby obtained for a set of closely related data. Nominally, the three channels of the device should provide the same outlet data. This allows to avoid, for example, guiding the aircraft on a trajectory and displaying another one, as this could occur with a usual architecture or even, that messages are obtained of the "FM position disagree" type during a demanding operation. The operational benefit is thus a reduction of the crew's workload when demanding operations are performed;

the position is true by virtue of the consolidation with at least three independent sources, thus allowing to reject a minority of erroneous input sources;

the trajectory segments are true, since the use of a cyclic redundancy checking or a sum of checks protects the device against erroneous input data;

a demanding operation can be initiated after the relevant trajectory segments have been memorized, without a breakdown of a flight management system resulting in an untimely interruption (loss of the flight plane and position). Such a scenario made the usual architecture particularly vulnerable;

calculated deviations are true, since, on each channel, true inputs (consolidated position and trajectory segments) are used and the calculation operation is performed on a high integrity calculator; and even in the case of an undetected erroneous deviation on a minor number of channels of the device, the subscribed systems can exclude such data through comparison with the other channels. Thereby, the crew is called on as little as possible, as the device is able to automatically exclude a breakdown.

Said calculator can be especially created for implementing the invention. However, in a preferred embodiment, said calculator is part of a high integrity calculation system already existing on the aircraft. In a first alternative embodiment, said calculator is part of a multimode receiver of the MMR ("Multi Mode Receiver") type which, usually, comprises two channels, and said device comprises at least two calculators arranged in two different MMR receivers, thus with a total of four channels. Additionally, in a second alternative embodiment, said calculator is integrated into an air data inertial reference unit of the ADIRU ("Air Data Inertial Reference Unit") type comprising one single channel and being part of an air data inertial reference system of the ADIRS ("Air Data Inertial Reference System") type. Moreover, in such a second alternative embodiment, said device comprises at least three calculators being respectively integrated into three different ADIRU units, thus with a total of three channels.

The previous integrations in already existing MMR or ADIRU means have a lot of advantages. In particular,
- the required redundancy for having at least three independent channels is achieved;
- such MMR or ADIRU means deliver critical data and have very high integrity levels; and
- such MMR or ADIRU means are generally already connected to a guidance calculator, as specified below, thereby simplifying the interface and limiting the latency delays.

According to the invention, the device is thus replicated on at least three different channels so that all the processings performed by said device are simultaneously implemented on those three channels. In order to obtain three redundant channels (or more), the device could comprise, for example, one single calculator directly comprising at least three channels, two calculators (in particular MMR multimode receivers) comprising at least two channels each, or three calculators each provided with one single channel.

In a particular embodiment, said device further comprises means for dating the deviations being transmitted to said guidance calculator.

Moreover, advantageously, the device according to the invention further comprises:
- auxiliary reception means for receiving, repeatedly, respectively from at least three different sources of information, current speed information for the aircraft;
- auxiliary calculation means for determining, repeatedly, a consolidated speed of the aircraft by means of said current speed information.

Furthermore, advantageously, the assistance device for navigation and guidance according to this invention, further comprises:
- means for calculating consolidated accuracy and integrity data, being associated with consolidated positions and consolidated speeds of the aircraft; and/or
- means for estimating a total system error of the TSE type as a function of the consolidated accuracy (NSE component) and of the deviations (FTE component); and/or
- means for determining an ability of the aircraft to carry out a particular performance demanding operation, such as a low RNP value operation, an accuracy approach without ground assistance means, or a non accuracy approach which, usually, does not use any ground means.

Furthermore, in an elaborated form, said assistance device for navigation and guidance, according to this invention, further comprises means for synchronizing data coming from several different (navigation) sources, so that all the measurements, more specifically of positions and speeds are aligned in the same time axis. Such a synchronisation could be implemented in particular by means of a usual correlator bank, for which phase shifts between signals are again found when a correlation peak is obtained. Such synchronization means allow to obtain, more specifically, the following advantages:
- the possibility to consolidate data from sources of different natures, that were not at first sight synchronized, such as data of the GNSS type with hybrid data of the GPIRS type;
- the improvement of the ability to exclude undetected errors on the sources through the consolidation algorithm, by virtue of the deletion on the latter of errors due to time shifts between the sources; and
- the improvement of the availability in the supply of the consolidated and true positions and speeds, as, in the case of a source breakdown, the latter could be replaced by another source of a different type.

Moreover, advantageously, said device further comprises:
- means for determining delays in a navigation and guidance chain; and/or
- means for correcting the effect of such delays in a navigation and guidance chain, so as to minimize a guidance error.

Consequently, thanks to the invention:
- the assistance device for navigation and guidance gathers the functions being essential to the high performance navigation, while organizing them around an architecture ensuring the robustness thereof;
- said device is replicated on at least three independent channels, thereby allowing to have a strong availability and allowing for the implementation of an automatic detection and an automatic exclusion of a minor number of erroneous outlet data;
- such data could be supplied to associated systems of the aircraft, more specifically, guidance, display and/or checking calculators, allowing, for example, to ensure that the aircraft is guided according to the data being actually displayed;
- said device could be integrated in a high integrity calculator already existing on the aircraft or be arranged in a calculator especially designed for implementing the present invention; and
- an elaborated form of said device allows for additional improvements regarding the FTE guidance error, as well as the availability of a true position.

The present invention also relates to a system for navigation and guidance of an aircraft, in particular a transport airplane.

According to the invention, said navigation and guidance system is remarkable in that it comprises:
- means generating a set of successive segments of a flight trajectory to be followed by the aircraft;
- a set of at least three different sources of information, each generating current position information for the aircraft;
- a device such as mentioned hereinabove, for determining deviations between, on the one hand, a consolidated position of the aircraft, beforehand calculated through said current position information, and, on the other hand, a current segment of said flight trajectory;
- a guidance calculator elaborating, at least by means of the deviations determined by said device, guidance orders intended for guiding the aircraft along said flight trajectory; and
- actuation means for actuating control members of the aircraft, as a function of the guidance orders elaborated by said guidance calculator.

The present invention also relates to:
- an aircraft comprising at least one assistance device for navigation and guidance, such as mentioned hereinabove; and/or
- an aircraft comprising at least one navigation and guidance system, such as mentioned hereinabove.

BRIEF DESCRIPTION OF THE DRAWINGS

The figures of the appended drawing will better explain how this invention can be implemented. In these figures, like reference numerals relate to like components.

DETAILED DESCRIPTION

Figure 1:
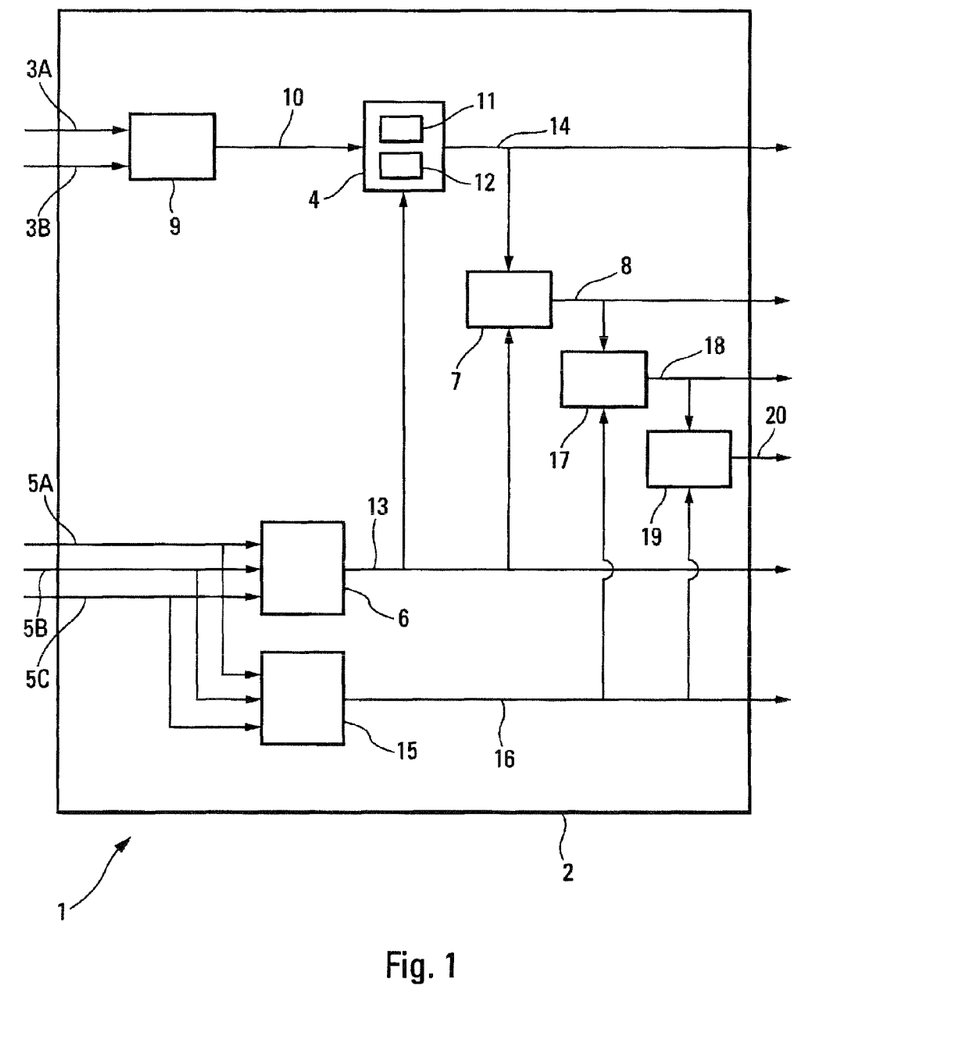
FIG. 1 is the block diagram of an assistance device for navigation and guidance according to the invention.

The device 1 according to this invention and schematically shown in a basic embodiment on FIG. 1, is intended for assisting the navigation and guidance of an aircraft (not shown), for example a transport (civil or military) airplane, along a flight trajectory (also not shown) comprising a plurality of successive (flight) segments. This device 1 has more specifically the object to improve the guidance and navigation performance of the aircraft, so as to allow it, in particular, to perform performance demanding operations, such as a low RNP value navigation or an accuracy approach, for example.

To this end, said device 1 being on board the aircraft comprises N independent channels, N being an integer higher than or equal to three, that is, that all the processings performed by this device 1 (and described below) are simultaneously carried out on at least three different channels, the elements to be used for the processings being replicated N times.

Additionally, as those channels are independent from each other, a breakdown or an error on one of such channels does not disturb the processings on the other channels.

Moreover, according to the invention, said device 1 comprises at least one calculator 2 being on board the aircraft and comprising at least the following integrated means:

data reception means, in such a case, links 3A and 3B, for receiving, from outside the device 1, from at least one source and preferably two different sources, to be described below, a set of successive (flight) segments of a usual flight trajectory to be followed by the aircraft;

a memorization means 4 for recording the different segments received via said links 3A and 3B;

data reception means, in this case, three links 5A, 5B and 5C, for receiving, repeatedly, from outside the device 1, respectively from at least three different sources of information, to be described below, current position information for the aircraft. Every current position piece of information indicates the current position of the aircraft, as determined by the corresponding source of information;

calculation means 6 being connected to said links 5A, 5B and 5C and being formed so as to determine, repeatedly (that is, each time new current position information are received), according to a usual calculation mode, a consolidated position of the aircraft, from said current position information received via said links 5A, 5B and 5C for a same effective position of the aircraft;

calculation means 7 being formed so as to determine repeatedly (that is for each new consolidated position being calculated), the lateral and vertical deviations between such a consolidated position and the current segment of the flight trajectory, being recorded in said memorization means 4; and data transmitting means, in this case, a link 8, for transmitting the deviations determined by said calculation means 7 to means outside the device 1, and in particular to a guidance calculator as described below.

Said reception means 3A and 3B comprise one or more inputs for receiving data of the flight plane. Such data more specifically define:

the geometry of the successive segments forming the flight plane; and the navigation performance level required for flying along each of such segments (RNP level, accuracy and integrity requirements for an accuracy approach, etc.).

Said device 1 further comprises means 9 for performing a usual integrity calculation, by means of a cyclic redundancy check of the CRC ("Cyclic Redundancy Check") type. Such an integrity calculation has a high ability to detect and reject erroneous data transmitted through said links 3A and 3B. Such means 9 are connected via a link 10 to said memorization means 4, and they transmit to the latter (with a view to recording them) only the flight trajectory segments that have been validated by the integrity calculation.

Said memorization means 4 comprise means 11 comprising, for example, a buffer memory with an associated logic circuit for maintaining an orderly chain of trajectory segments. The recorded trajectory segments have been first validated by the integrity calculation implemented by means 9. Such means 11 are formed so as to maintain an orderly chain of segments:

without any duplication existing. To this end, should a source of information be lost, connected to one of the links 3A and 3B, in particular a flight management calculator, providing the input flight plane, a switch is performed to another source of information, for example another flight management calculator, transmitting in a de-synchronized and delayed way compared to the first source, a part of the already stored segments; and without any trajectory holes existing between successive segments. To this end, should a source be lost providing the flight plane, a switch is optionally performed to another de-synchronized source and ahead of such a first source. Such an implementation requires that several segments are stored ahead compared to the current segment.

Said memorization means 4 further comprise means 12 for implementing the following steps consisting in:

identifying, at each instant, from a consolidated position and from a consolidated speed received via a link 13, the current segment, that is, the segment of the flight trajectory the aircraft is currently following;

defining the following segments (that is, directly following the current segment) according to an order in accordance to the flight plane; and performing a check of the segments being recorded in the means 11, to ascertain the availability of such following segments.

The device 1 also comprises means (not shown) for warning the pilot ahead, when the following segments are not available, so as to then allow him to prepare an exit from the (high performance) on going operation and this in the better anticipation conditions.

The previous information can also be transmitted via a link 14 to user means, outside the device 1.

Furthermore, said links 5A, 5B and 5C also provide to the means 6, repeatedly, current speed information of the aircraft, representing the current speeds actually measured by at least three different sources of information, preferably those providing the current position information. Said means 6 use the thus received current speed information for calculating, repeatedly, according to a usual calculation mode, a consolidated speed of the aircraft.

The calculation of the consolidated position and the consolidated speed, implemented by said means 6, from at least three independent sources of information, allows for the automatic exclusion of a minority of erroneous sources. Such independent sources are the same for each of the N redundant channels of the device 1. Preferably, the position information and the speed information, measured by the sources of information, are measured substantially at the same instant, so as to be able to perform an efficient exclusion of possible errors.

Moreover, said device 1 further comprises means 15 being connected to said links 5A, 5B and 5C and being formed to as to perform a usual calculation of the consolidated accuracy and integrity, from the same sources as those supplying the means 6. The accuracy and integrity data determined by said means 15 are associated with the consolidated position and the consolidated speed, determined by said means 6. Such accuracy and integrity data could be transmitted via a link 16 more specifically to user means outside said device 1.

The device 1 can also comprise means (not shown) for dating the deviations that are transmitted by said means 7.

Additionally, in a particular embodiment, said device 1 also comprises means 17 being connected to said means 7 and 15 and being formed so as to estimate a total system error of the TSE type. Such means 17 determine such a total system error TSE as a function of the consolidated accuracy received from said means 15, illustrating a NSE error, and of the deviations calculated by said means 7, illustrating a FTE error. The total system error TSE could be transmitted via a link 18, more specifically to user means outside said device 1.

Moreover, in a particular embodiment, said device 1 also comprises means 19 being, for example, connected to said links 16 and 18 and being formed so as to check whether the aircraft is able to perform a particular operation, being performance demanding, for example a low RNP value operation, an accuracy approach or a non accuracy approach.

For a RNP low value operation, said means 19 can perform successively the following steps consisting in:
  receiving the value of the total system error TSE, determined by said means 17;
  comparing such an error TSE to a RNP level required on the associated trajectory segment. The required RNP level and the associated trajectory segment are received from said memorization means 4. In order not to overload FIG. 1, the link existing between the memorization means 4 and the means 19 has not been illustrated on this FIG. 1; and
  checking the state of the automatic pilot and of the flight director of the aircraft.

As far as an accuracy approach is concerned with no ground assistance means, the means 19 could perform the following steps consisting in:
  comparing the accuracy and integrity levels received from said means 15 with the levels required for the accuracy approach, that have been stored in said device 1; and
  checking the state of the automatic pilot and of the flight director.

Moreover, regarding a non accuracy approach of the FLS ("FMS Landing System") type, said means 19 can compare the accuracy and integrity levels received from said means 15, to the levels required for this approach that are recorded in said device 1.

Said means 19 can perform the previous operations, not only for the current segment of the flight trajectory, but also for the next segments, as the latter are stored in the memorization means 4. Thus, the device 1 can, for example, warn the pilot beforehand that a performance demanding operation cannot proceed anymore, when the memorization means 4 does not contain the next segments of the flight trajectory (following the current segment).

Within the scope of the present invention, each calculator 2 of the device 1 can be created especially for implementing this invention. However, in a preferred embodiment, each calculator 2 is part of a high integrity calculation system (or calculator) already existing on the aircraft.

In a first alternative embodiment, said calculator 2 is part of a multimode receiver of the MMR ("Multi Mode Receiver") type which, usually, comprises two channels, and said device 1 comprises at least two calculators 2 arranged in two different MMR receivers of the aircraft.

In the case where the device 1 comprises in total four channels, the requirement concerning the channels (more than three channels), ensuring the integrity of the outlets, is met. In such a case, the first three channels can be dedicated to the above mentioned functions, and the fourth channel can be used for improving the true data supply availability, as it is possible to reject one of such first three channels when it is erroneous.

Additionally, in a second embodiment, said calculator 2 is integrated into an air data inertial reference unit of the ADIRU ("Air Data Inertial Reference Unit") type comprising one single channel and being part of an air data inertial reference system of the ADIRS ("Air Data Inertial Reference System") type. Moreover, in this second alternative embodiment, said device 1 comprises at least three calculators 2 being respectively integrated into three different ADIRU units, supplying GPIRS inertial and hybrid usual data.

The previous integrations of calculators 2 in the already existing MMR or ADIRU means have numerous advantages. In particular,
  the required redundancy for having at least three channels is ensured;
  such MMR or ADIRU means deliver critical data and have very high integrity levels; and
  such MMR or ADIRU means are, generally already connected to a guidance calculator, as specified below, thereby simplifying the interface and limiting the latency delays.

Figure 2:
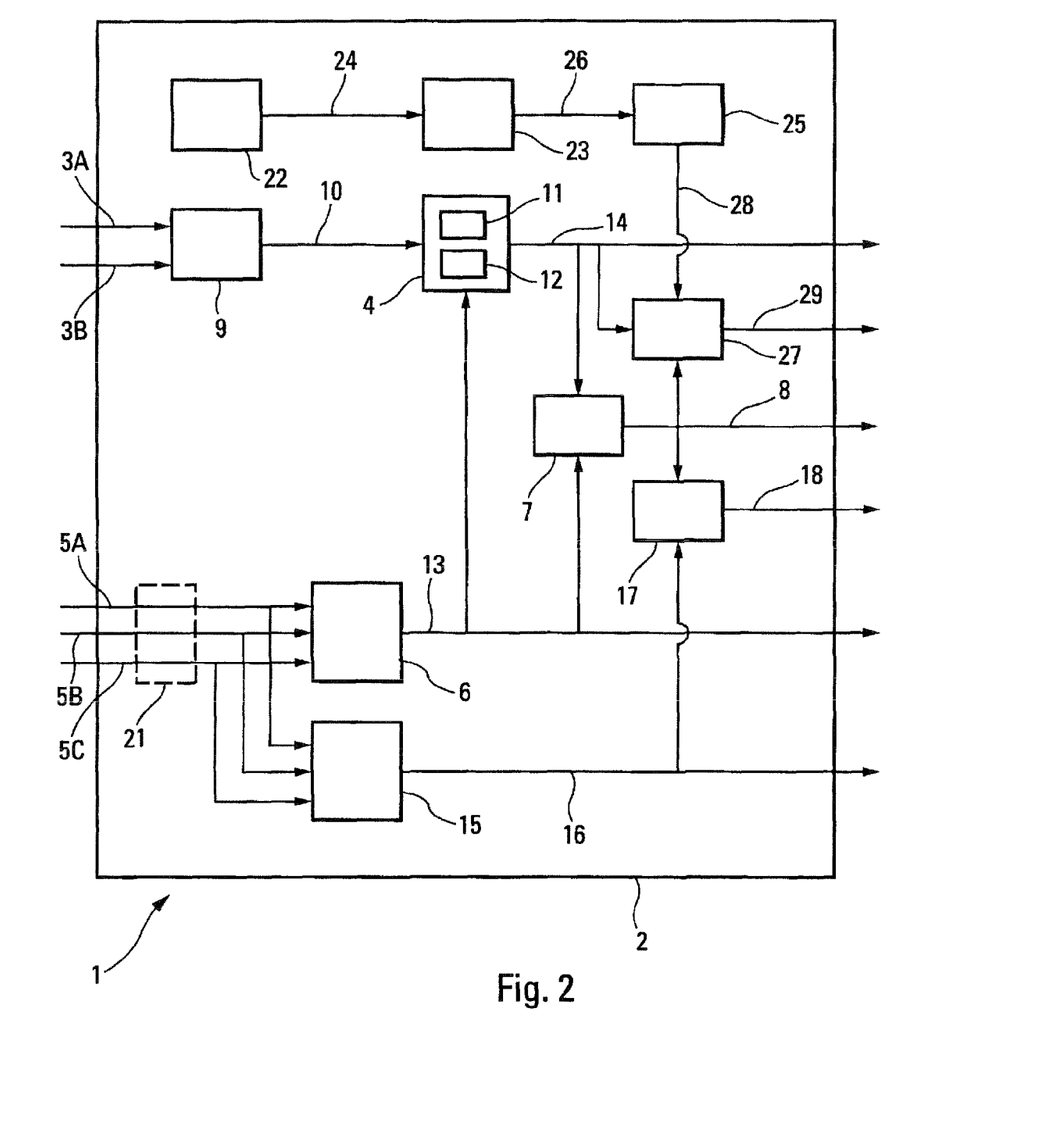
FIG. 2 schematically illustrates a particular embodiment of a device according to this invention.

Furthermore, in an elaborate embodiment aiming at achieving guidance high performance, said device 1 further comprises, as shown on FIG. 2, means for synchronizing data issued from different sources of information so that all the measurements, more specifically, of positions and speeds are aligned in the same time axis. Such a synchronisation could be implemented in particular by means of a usual correlator bank for which phase shifts between signals are again found when a correlation peak is obtained. Such synchronization means 21 allow the following advantages to be obtained:
  the possibility of consolidating data issued from sources of different natures, which were not at first sight synchronized, such as data of the GNSS ("Global Navigation Satellite System") type with hybrid data of the GPIRS ("hybrid GPs and Inertial Reference System") type;
  the improvement of the ability to exclude undetected errors on the sources by a consolidation algorithm (of means 6 or 15), by virtue of the deletion on the latter of errors due to time shifts between the sources; and
  the improvement of the availability in the supply of the consolidated and true positions and speeds, as, in the case of a source breakdown, the latter could be replaced by another source of a different type.

Moreover, in this elaborated embodiment, said device 1 further comprises means 22 allowing delays to be estimated in a navigation and guidance chain. Such means 22 determine a transit time TD between the arrival of a piece of information in a navigation source and the triggering of an action, being related to this same piece of information, by a guidance function.

In a first alternative embodiment, the estimation of the transit time TD comprises associating a control with a data that is going to transit from a navigation source (means 32 for example) up to a guidance calculator (calculator 39 for example). The arrival of the control at the navigation source initiates a first interruption for dating the departure. When this same control arrives at the guidance calculator, a second interruption is initiated for dating the arrival instant. While calculating the difference between those two instants, the means 22 obtain the estimation of the transit time TD between those two points of the navigation and guidance chain.

In a second alternative embodiment, said means 22 can use a systematic time stamping of all the data supplied by the navigation sources for estimating the transit time TD in the navigation and guidance chain. When a data switches to a next function (in the chain), a field is reserved on the outlet data for maintaining the time stamping that came from the navigation data. At the end of the transit, upon the arrival at the guidance calculator, the found time stamping is compared to the current time on a clock of the aircraft. The time difference provides the transit time TD.

Moreover, said device 1 could further comprise:
means 23 being connected via a link 24 to said means 22 and being formed so as to predict, by means of a predictive model, a guidance error FTE on a number of next segments (directly following the current segment) from the delay (or transit time TD) estimated by said means 22. In such a case, a variable is used representing the advance time TA it is possible to impose on the guidance order. Thereby a table is obtained having the form FTE=f(TA);
means 25 being connected via a link 26 to said means 23 and being formed so as to optimize the advance time TA. Such means 25 determine an advance time TA minimizing the guidance error FTE from information received from said means 23; and
means 27 being connected via a link 28 to said means 25 and being formed so as to produce guidance orders by activating the order by one advance time TA compared to the transition point between the current segment and the next segment of the flight trajectory. Such an anticipated activation is transmitted via a link 29.

In another alternative embodiment (not shown), instead of using an advance time TA, the device 1 foresees to advance the deviation calculations, implemented by said means 7 or by specific means, of the transit time TD determined by said means 22, in order to counter the effect of the delay. This can be achieved correcting beforehand at the first order the consolidated position. Such an alternative embodiment is simpler than that shown on FIG. 2 using said means 23, 25 and 27, as it does not implement any predictive model for the guidance error FTE. It is equivalent to bring the operation of the guidance loop back in a smaller delay mode.

The elaborated embodiment of the device 1, such as previously described and represented more specifically on FIG. 2, has the following advantages:
the improvement in the availability of an true consolidated position; and
the minimization of the guidance error FTE and the possibility to reject the limits of the RNP value (that it is possible to fly with an aircraft) to a smaller value.

Moreover, by means of this invention:
the assistance device 1 for navigation and guidance gathers the functions being essential to the high performance navigation, while organizing them around an architecture ensuring the robustness thereof;
said device 1 is replicated on at least three independent channels, allowing to have a strong availability and allowing for the implementation of an automatic detection and an automatic exclusion of a minor number of erroneous outlet data;
such data could be supplied to associated systems (calculator 39, set 45) of the aircraft, more specifically, guidance, display and/or checking calculators, thereby allowing, for example, to ensure that the aircraft is guided following the data being actually displayed;
said calculator 2 of the device 1 could be integrated into a high integrity calculator already existing on board the aircraft or be arranged in a calculator specially designed for implementing the present invention; and
an elaborated form of said device 1 allows for additional improvements regarding the FTE guidance error, as well as the availability of a true position.

Figure 3:
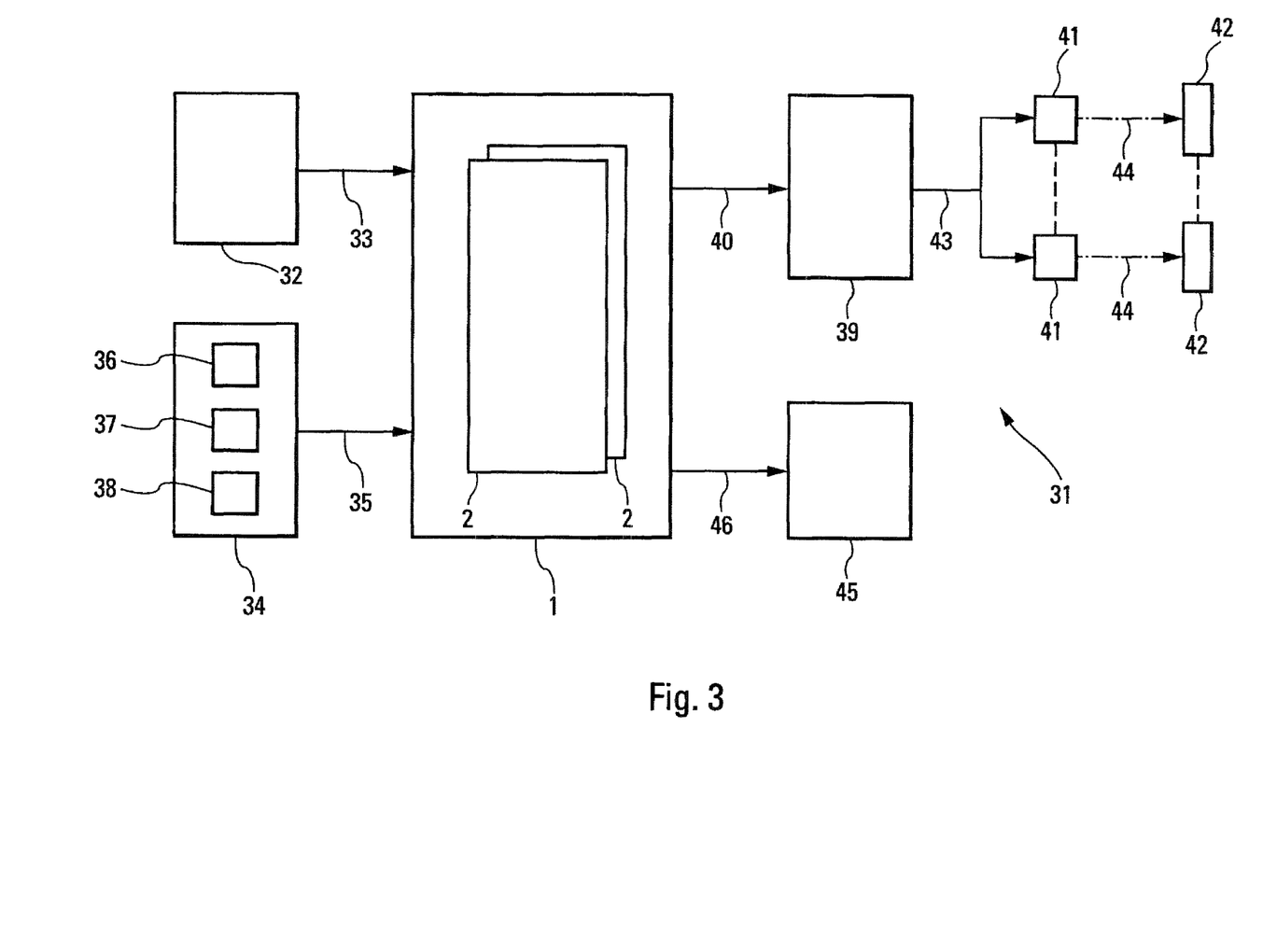
FIG. 3 is the block diagram of a navigation and guidance system according to this invention.

In a preferred embodiment, said assistance device 1 for navigation and guidance, according to this invention, is part of one navigation and guidance system 31 further comprising, as shown on FIG. 3:
means 32 being connected, via a link 33 (more specifically gathering the links 3A and 3B of FIGS. 1 and 2), to said device 1 and being intended for supplying at least said set of successive segments of the flight trajectory;
a set 34 of sources of information, being connected via a link 35 (more specifically gathering the links 5A, 5B and 5C of FIGS. 1 and 2) to said device 1, and comprising at least three different sources of information 36, 37 and 38. Such sources of information 36, 37 and 38 are usual sources to be used for supplying said current position information and said current speed information; and
a guidance calculator 39, for example of the FG ("Flight Guidance") type, being connected via a link 40 (comprising at least some of the outlet links of the device 1, represented on FIGS. 1 and 2) to the device 1, performing usual processings intended for guiding the aircraft along the flight trajectory, and more specifically elaborating, at least by means of the deviations determined by said device 1, guidance orders; and
usual actuating means 41 for control members 42 of the aircraft, for example (lateral, depth, rolling) rudders and/or the engines of said aircraft. Said actuation means 41 receive guidance orders from said guidance calculator 39 via link 43 and correspondingly actuate said control members 42, as illustrated by the links 44 in dots and dashes.

Said means 32 could more specifically comprise a flight management system, for example of the FMS ("Flight Management System") type, being, for example, associated with a navigation data base and determining, usually, the successive segments of the flight trajectory to be followed by the aircraft. Each of the links 3A and 3B can be connected to a flight management calculator of the FMS system.

Moreover, said device 1 comprises one or more calculators 2 so as to obtain at least N independent channels. On the example of FIG. 3, said device 1 comprises two calculators 2 being each one, for example, part of a multimode receiver of the MMR type, as above mentioned.

Furthermore, said system 31 can also comprise a set 45 of usual auxiliary means, being connected via a link 46 to said device 1. Such a set could more specifically comprise display means and/or checking means and/or warning means.

The invention claimed is:

1. An assistance device for navigation and guidance of an aircraft, said device (1) comprising:
 first calculation means (6) for determining a position of the aircraft;
 second calculation means (7) for determining deviations between said position of the aircraft and a current segment of a flight trajectory; and
 transmission means (8) for transmitting such deviations to a guidance calculator (39),
 means (15) for calculating consolidated accuracy and integrity data, being associated with consolidated positions and consolidated speeds of the aircraft,
 wherein:
 said device comprises at least one calculator (2) being on board the aircraft, into which said first and second calculation means (6, 7) and said transmission means (8) are integrated, and which further comprises at least the following integrated means:
 first reception means (3A, 3B) for receiving a set of successive segments of a flight trajectory to be followed by the aircraft;
 memorization means (4) for recording said segments; and
 second reception means (5A, 5B, 5C) for receiving, repeatedly, respectively from at least three different sources of information (36, 37, 38), current position information for the aircraft;
 said first calculation means (6) are formed so as to determine, repeatedly, a consolidated position of the aircraft, from said current position information;
 said second calculation means (7) are formed so as to determine, repeatedly, the deviations between said consolidated position and a current segment of the flight trajectory, being recorded in said memorization means (4); and
 said device (1) is replicated on at least three different and independent channels so that all the processings performed by said device (1) are simultaneously carried out on said at least three channels.

2. A device according to claim 1, further comprising means for dating the deviations being transmitted to said guidance calculator (39).

3. A device according to claim 1, further comprising:
 auxiliary reception means (5A, 5B, 5C) for receiving, repeatedly, respectively from at least three different sources of information (36, 37, 38), current speed information for the aircraft;
 auxiliary calculation means (6) for determining, repeatedly, a consolidated speed of the aircraft, by means of said current speed information.

4. A device according to claim 1, further comprising means (17) for estimating a total system error.

5. A device according to claim 1, further comprising means (19) for determining an ability of the aircraft to carry out a particular performance demanding operation.

6. A device according to claim 1, further comprising means (21) for synchronizing data coming from several different sources (36, 37, 38).

7. An assistance device for navigation and guidance of an aircraft, said device (1) comprising:
 first calculation means (6) for determining a position of the aircraft;
 second calculation means (7) for determining deviations between said position of the aircraft and a current segment of a flight trajectory; and
 transmission means (8) for transmitting such deviations to a guidance calculator (39),
 means (22) for determining delays in a navigation and guidance chain,
 wherein:
 said device comprises at least one calculator (2) being on board the aircraft, into which said first and second calculation means (6, 7) and said transmission means (8) are integrated, and which further comprises at least the following integrated means:
 first reception means (3A, 3B) for receiving a set of successive segments of a flight trajectory to be followed by the aircraft;
 memorization means (4) for recording said segments; and
 second reception means (5A, 5B, 5C) for receiving, repeatedly, respectively from at least three different sources of information (36, 37, 38), current position information for the aircraft;
 said first calculation means (6) are formed so as to determine, repeatedly, a consolidated position of the aircraft, from said current position information;
 said second calculation means (7) are formed so as to determine, repeatedly, the deviations between said consolidated position and a current segment of the flight trajectory, being recorded in said memorization means (4); and
 said device (1) is replicated on at least three different and independent channels so that all the processings performed by said device (1) are simultaneously carried out on said at least three channels.

8. An assistance device for navigation and guidance of an aircraft, said device (1) comprising:
 first calculation means (6) for determining a position of the aircraft;
 second calculation means (7) for determining deviations between said position of the aircraft and a current segment of a flight trajectory; and
 transmission means (8) for transmitting such deviations to a guidance calculator (39),
 means (23, 25, 27) for correcting the effect of delays in a navigation and guidance chain, so as to minimize a guidance error,
 wherein:
 said device comprises at least one calculator (2) being on board the aircraft, into which said first and second calculation means (6, 7) and said transmission means (8) are integrated, and which further comprises at least the following integrated means:
 first reception means (3A, 3B) for receiving a set of successive segments of a flight trajectory to be followed by the aircraft;
 memorization means (4) for recording said segments; and
 second reception means (5A, 5B, 5C) for receiving, repeatedly, respectively from at least three different sources of information (36, 37, 38), current position information for the aircraft;
 said first calculation means (6) are formed so as to determine, repeatedly, a consolidated position of the aircraft, from said current position information;
 said second calculation means (7) are formed so as to determine, repeatedly, the deviations between said consolidated position and a current segment of the flight trajectory, being recorded in said memorization means (4); and said device (1) is replicated on at least three different and independent channels so that all the processings performed by said device (1) are simultaneously carried out on said at least three channels.

9. A navigating and guidance system for an aircraft, comprising:
- means (32) generating a set of successive segments of a flight trajectory to be followed by the aircraft;
- a set (34) of at least three different sources of information (36, 37, 38), each generating current position information of the aircraft;
- a device (1) such as specified according to claim 1, for determining deviations between a consolidated position of the aircraft, beforehand calculated through said current position information, and a current segment of said flight trajectory;
- a guidance calculator (39) elaborating, at least by means of the deviations determined by said device (1), guidance orders intended for guiding the aircraft along said flight trajectory; and
- actuation means (41) for actuating control members (42) of the aircraft, as a function of the guidance orders elaborated by said guidance calculator (39).

* * * * *